United States Patent [19]

Kitahara et al.

[11] Patent Number: 4,835,656
[45] Date of Patent: May 30, 1989

[54] MULTI-LAYERED CERAMIC CAPACITOR

[75] Inventors: Naoto Kitahara; Hiroaki Tanidokoro; Masahiro Hirama; Yoshinori Shinohara; Kazuyasu Hikita, all of Yokoze, Japan

[73] Assignee: Mitsubishi Mining and Cement Co., Ltd., Tokyo, Japan

[21] Appl. No.: 182,774

[22] Filed: Mar. 7, 1988

[30] Foreign Application Priority Data

Apr. 4, 1987 [JP] Japan .................................. 62-82227
Apr. 4, 1987 [JP] Japan .................................. 62-82228

[51] Int. Cl.⁴ ........................ H01G 4/10; H01G 1/01
[52] U.S. Cl. ..................................... 361/321; 29/25.42
[58] Field of Search ................... 501/138, 136; 264/61; 29/25.42; 361/328, 329, 311–313, 320, 321

[56] References Cited

U.S. PATENT DOCUMENTS

| | | | |
|---|---|---|---|
| 2,972,180 | 2/1961 | Gulton et al. | 361/321 X |
| 3,267,342 | 8/1966 | Pratt et al. | 361/321 |
| 3,467,898 | 9/1969 | Ruffner | 361/321 X |
| 3,469,161 | 9/1969 | Davis | 361/321 |
| 3,784,887 | 1/1974 | Sheard | 361/321 X |
| 3,819,990 | 6/1974 | Hayashi et al. | 361/321 X |
| 4,082,906 | 4/1978 | Amin et al. | 361/321 X |
| 4,267,634 | 5/1981 | Wellard | 338/307 X |

Primary Examiner—Donald A. Griffin
Attorney, Agent, or Firm—Hoffman, Wasson, Fallow & Gitler

[57] ABSTRACT

A multi-layered ceramic capacitor characterized by a structure containing glass material layers imposed between adjacent ceramic layers and conductive layers which sandwich the glass material therebetween. The conductive electrode layers and/or glass material layers bind the thin ceramic film pieces during firing at lower temperatures resulting in a strong bonded capacitor having numerous electrical applications.

17 Claims, 1 Drawing Sheet

MULTI-LAYERED CERAMIC CAPACITOR

FIELD OF THE INVENTION

The present invention relates to multi-layered ceramic capacitor(s) utilizing fired and sintered ceramic thin plates (film pieces), and a method of the production of the same. Particularly, it relates to the structure, and the method of forming of the multi-layered ceramic capacitor(s) as may typically be used in miniature hybrid circuit modules which is usable particularly for high frequency circuit.

DESCRIPTION OF THE PRIOR ART

Recently, the miniaturization of the electronics device requires and advances the miniaturization of capacitors and circuitry, and then, a variety of techniques to produce miniatured multi-layered ceramic capacitors have been proposed and used (see U.S. Pat. No. 4,082,906).

The prior art multi-layer ceramic capacitors have been produced mainly by the following two methods.

The first one of manufacturing multi-layered capacitors comprises preparing dielectric material paste consisting essentially of very finely divided ceramic particulate and materials and organic binding agent(s), and conductive paste consisting essentially of very finely divided metal material and organic binding agent(s) homogeneously mixed with, and then, forming multiple layers comprising alternatively layered of ceramic paste material layers and conductive paste formed layers, then drying the formed multi-layed laminate, and firing the thus formed multi-layed laminate to form the sintered laminate capacitor.

The second one of manufacturing multi-layer capacitors comprises forming ceramic "green sheet" from dielectric material paste by a doctor blade techniques, and cutting into the desired shape and dimension of the sheet, and drying the ceramic green sheets, and then, applying a conductive paste on the surface of the sheet by a screen printing technique to form a conductive layer followed by drying, and piling up those ceramic sheets with conductive layer to form a stack of multi-layered, and then, heat sticking those layers. A stack of multiple layers of conductive material thin plates and dielectric material thin plates is fired to produce a multi-layered capacitor.

However, in those processes, the dielectric ceramic material plates with metal paste layers must be fired at the high temperature of 1,200° to 1,400° C., and therefore, the used metal is necessitated to have the characteristics of being inactive or inert even at the temperature of 1,200° to 1,400° C. and incapable of being oxidized at that temperature. The precious metals such as gold, palladium and platinum or the alloy thereof (that is inert to the used ceramic material and does not melt even at such temperature) must be used for forming the electrode in order to remain in conductive form while buried in the ceramic during the firing or sintering process. Those precious metals are relatively expensive and the multi-layer ceramic capacitors using those precious metals will increase the cost of the manufacture, and therefore, the reduction of the cost thereof is very difficult.

The capacitor in use for the high frequency circuit is also required to be miniatured because the electronic device has been developed and advanced in use for the high frequency circuit.

The dielectric materials used in the prior art miniatured multi-layered ceramic capacitors are, in general, ceramic materials including barium titanate and titanium oxide, but the mica material for the thin dielectric material is used for production of the capacitor where the current of the high frequency range such as several tens M Hz to several G Hz is applied, and it is required that the equivalent series resistance for such high frequency current is several tens miliohms. However, such material to be adapted to the high frequency is apt to have higher dielectric loss. Further, there is the other requirements of the metal used for constituting the internal electrode being inert even at the temperature of 1,200° C. to 1,400° C. to the dielectric material to constitute the multi-layers, and being inert or inactive to oxidation of the metal at that high temperature. No combination of the metal and the dielectric material is proposed to satisfy those requirements.

SUMMARY OF THE INVENTION

With the foregoing considerations in mind, the present invention contemplates the provision of an improved multi-layered ceramic capacitor characterized by the structure in which glass material layers are imposed between adjacent ceramic layers in the stack for the multi-layered capacitor and conductive layers formed on the adjacent ceramic layers are sandwiching the glass material layer, and one or both of the glass material layer and conductive layer serve to join the adjacent ceramic layers so as to make the stack of multi-layered capacitor firmly strongly.

It is an object of the present invention to provide a monolithic capacitor which does not need any precious metal for electroding.

It is another object of the present invention to resolve the problem of the prior art multi-layer capacitor in that the precious metal is required to form the inner (buried or enclosed) electrodes of the capacitor.

It is further object of the present invention to provide the novel structure of the multi-capacitor in which the conductive layers for electroding or the glass material layers bind the thin ceramic film pieces together by firing at lower temperature the stack of the ceramic film pieces respectively sandwiching the layers formed by conductive paste or conductively binder material or-/and glass powder paste.

It is more further object of the present invention to provide the multi-layered capacitor without any void among the layers of the stack which is formed by sandwiching glass layers between the fired ceramic film pieces and firing at the lower temperature to melt the glass material of the glass layers so as to bind the ceramic film pieces sandwiching the glass layer.

It is the other object of the present invention to provide the structure of the multi-layer capacitor which can be accurately and efficiently stacked and manufactured.

It is further object of the present invention to provide a multi-layered ceramic capacitor having less equivalent series resistance to the current of high frequency of several tens M Hz to several G Hz. Hereinafter, the "high frequency" means the frequency range of several M Hz to several M Hz, and is used particularly in the multi-layered ceramic capacitor.

It is another object of the present invention to provide the structure of the multi-layered capacitor with accurate positioning of inner electrodes and high mechanical strength.

It is the further object of the present invention to provide the structure of the multi-layered capacitor with less equivalent resistance between neighboring electrodes inserting the dielectric layer, in the range of the high frequency.

It is the other object of the present invention to provide the structure of the multi-layered capacitor without any hollow neither any space between each ceramic layer, and the glass layer being formed between each of the ceramic layers by applying glass paste on the ceramic layers to from glass paste layers, and firing at the lower temperature a stack of multiple layers having alternatively the ceramic layers and the glass paste layers to stick together those layers in which very thin ceramic plates can be used as a layer for the stack, and piled into the stack.

It is the further object of the present invention to provide the structure of the multi-layered capacitor, in which couples of metal layers in use for the electrodes of the capacitors are formed, each couple thereof sandwiching the glass layer, and are the same potential, the equivalent series resistance value being less in the high frequency.

The essence of our invention resides in the discovery that the final firing or making temperature can be carried out below 900° C. by utilizing fired thin film pieces and glass material layer being imposed in the fired thin film pieces and/or conductive layers to join the fired ceramic layers. We found that melting of glass material in the imposed glass material layers allows the joining of the fired ceraic film pieces to be achieved at from 500° C. to 900° C. The resulting multi-layered capacitor is strong and has useful electrical properties for all kinds of circuitry.

DETAILED DESCRIPTION OF PREFERRED EMBODIMENTS

Figure 1:
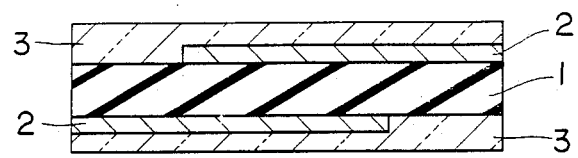
FIG. 1 illustrates schematically the section of one couple units of ceramic layer, and conductive material layers and glass material layers which sandwich the ceramic layer, thereby to constitute ceramic capacitor of the present invention.

In accordance with the present invention, the novel structure of a monolithic ceramic capacitor can be produced, which comprises a plurality of ceramic fired thin film pieces and joining layers interpositioning or lying between the ceramic thin film pieces, those ceramic film pieces and those joining layers being alternatively piled to form a stack of ceramic plates and joining layers. The joining layer in general is essentially consisting of glass material layer and/or conductive material layer, the conductive material layer being constituting given patterns of inner electrode(s) and buried in the glass material layer. Therefore, the multi-layered ceramic capacitors of the present invention do not have any open air (striped) inner electrodes. The ceramic thin film piece has preferably dielectric loss of less than 0.01, and thickness of less than 200 micrometer.

The process of manufacturing the inventive multi-layered capacitor comprises forming a conductive layer pattern and glass paste layer on a fired thin ceramic film piece, stacking the thus formed stacks of ceramic layers, and put each one ceramic thin film piece on the top surface of the stacks and the bottom surface of the stacks, and then firing the such stacked structure at the lower temperature to be cured and joined.

The gist of the present invention resides in a multi-layered ceramic capacitor having alternative layers stacked of dielectric layers and conductive material layers wherein a plurality of ceramic fired thin pieces having conductive layer(s) on both surfaces or one surface of the ceramic film pieces are combined or joined in stack by imposing glass material joining layer between the ceramic pieces. The two conductive layers sandwiching the glass layer may be in the same electric potential.

The said conductive material layer may be made from a metal selected from the group consisting of silver, copper, palladium and the combination thereof. The inventive multi-layered capacitor can be produced by forming a pattern of a conductive material layer on the surface(s) of a thin ceramic film piece that has been independently and separately fired by means of screen printing technique; then applying glass paste on the thus formed surface of the ceramic film by means of the screen printing technique, then stacking a plurality of the thin ceramic film pieces having such pattern of the conductive layer imposing such glass paste layer, and then subjecting the stacked structure to a heat treatment at a temperature in the range at that the glass paste layer can be melt to join or stick the ceramic thin film pieces sandwiching the glass material layer.

The structure of the inventive multi-layered ceramic capacitor is essentially consisting of ceramic thin film pieces(or layers) and joining layers, in that a plurality of ceramic film pieces are stacked and joined imposing the joining layer, and the joining layer may be formed from a predetermined pattern of conductive material layer and glass material layer, in that either one or both of the glass layer and conductive layer functions to join or stick the ceramic layers. When the glass layer functions to join the ceramic layers, a plurality of the thin ceramic film pieces can be stacked imposing the glass layer, and fired to melt the glass paste in the glass layer. When the conductive layer functions to join the ceramic thin layers, a conductive paste or conductive adhesive agent is used to be applied to the surface of the thin ceramic film pieces, and the ceramic film pieces are set to be joined.

In the inventive multi-layered capacitor, because the fired ceramic film piece is used, the substrate or the structure of the stacked ceramic film pieces is not deformed even through the heat treatment to melt the glass paste in the glass layer after the glass paste is applied to the surface of the thin ceramic film pieces. Accordingly, there is no need of considering the shrinkage of the substrate, in designing the patterns of the inner electrodes in the capacitor. The inner electrodes can be correctly and accurately formed as compared with the prior art capacitor. Further, the thin ceramic film pieces can rarely be bend backwards. In addition, a large number of the ceramic film pieces can be stacked even being very thin.

In accordance with the present invention, the conductive patterns, or the inner electrodes are not exposed to the outer open air, and therefore, precious metal such as noble metal paste is not needed to form the inner electrodes. That means metal material other than noble metal material can be used to form the inner electrodes.

When the glass layer is used to join the ceramic film pieces in the stack, glass paste is applied to the surface of the ceramic film piece to form the glass paste layer by means of screen printing technique thereby to form a joining layer of the glass paste layer. Such structure of the stack is fired at the relatively low temperature so as to melt the glass paste layer to joint the ceramic film pieces sandwiching the glass layer. The glass layer is formed over the whole surface of the ceramic film without any void nor space between the two layers (the two ceramic film pieces), and therefore, the adhesive force produced by the joining glass layer is strong enough to join and bond tightly the two ceramic film pieces. As a result the multi-layerd ceramic capacitor with high strength can be produced. In those glass layers, conductive patterns are formed so as to form electrodes for the capacitor, which electrodes are incorporated in and/or among the glass layer, and therefore, is not exposed outside (to the air).

Because the inventive capacitor has the glass material layer as a joining layer, it gives good sealing ability and good insulating performance, that can provide an easy-handling capacitor. The glass material layers have excellent electric insulation, and then, the two conductive layers sandwiching the glass material layer, each of which is printed separately on the surfaces of the different and adjoining ceramic film pieces are kept in excellent insulation and further in good sealing.

Even when the glass material layer is not used as a joining layer, and is used merely as a packing layer, and the conductive layer is used as a joining layer, glass material is packing in the space among the conductive patterns of the inventive capacitor, so that the sealing of the inner electrodes can be easily kept.

Further, the ceramic film pieces to be laminated are a fired thin plate or film, the margins to be used for positioning the electrode patterns formed on the ceramic film pieces can be narrower, Then, the accuracy of electrode pattern positioning can easily attained. It enables to establish elaborate electrode pattern manufacture of the capacitor. The thickness of the ceramic film pieces to be laminated is preferably below 200 micrometer so as to restrain the whole thickness of the multi-layered capacitor. Such thin ceramic film pieces enable the manufacture of the dielectric material with less dielectric loss, and further, facilitate the finely determining of the position of the electrode patterns formed on the ceramic film pieces because the fired ceramic film pieces are so thin to be transparent in determining the position of the electrode patterns. In addition, the inventive structure of the capacitor can easily adjust the configuration of the ceramic layers to be used in the capacitor by removing easily the deformation of the fired thin film pieces. The resulting capacitor has highly flat surface. Therefore, the range of the preferable thickness of the fired ceramic film pieces to be used in the capacitor is from 20 micrometer to 200 micrometer.

The capacitor of the present invention is in the structure in that a plurality of fired ceramic film pieces are laminated with inserting glass material layers formed on the surface of the ceramic film pieces, forming inner electrode patterns on either of the surfaces of each ceramic film pieces except of the top and bottom film pieces.

Further, the structure of the inventive capacitor will be better understood from the following description taken in conjunction with the accompanying drawings.

Figure 2A:
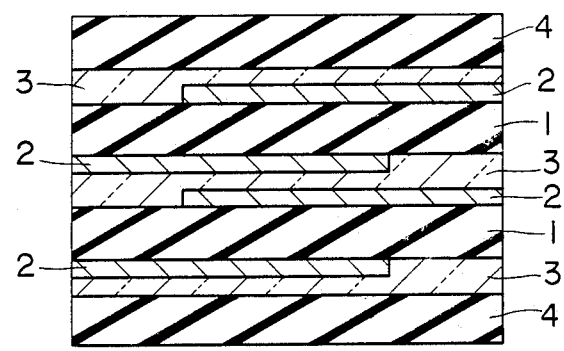
FIG. 2A illustrates schematically the section of one embodiment of the multi-layered ceramic capacitor of the present invention.
Figure 2B:
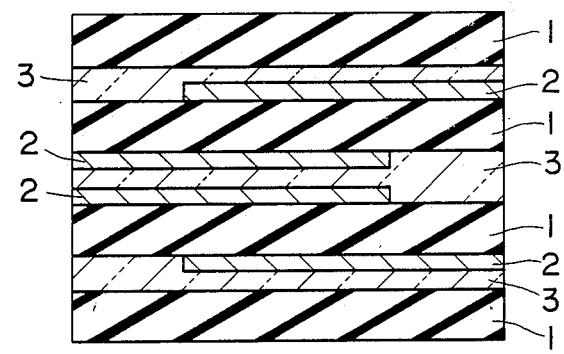
FIG. 2B illustrates schematically the section of another embodiment of the multi-layered ceramic capacitor of the present invention.

One embodiment of the inventive capacitor has structural unit of thin ceramic film pieces as shown in FIG. 1, wherein conductive material layers 2 are formed on either of the surfaces of ceramic film piece 1, and further, glass material layers 3 are formed on the whole surfaces (including on the surfaces of the conductive material layers) of the ceramic film pieces. A plurality of such structural units as shown in FIG. 1, are laminated in obverse orientation (to form the structure as shown in FIG. 2 A), or in reverse orientation (to form the structure as shown in FIG. 2 B), and top and bottom ceramic cover film pieces 4 are positioned on the top and bottom of the stack so as to prevent exposure of glass material layer to outside air. The resulting each structure of the capacitor is in section respectively as shown in FIGS. 2A and 2B. When the structural units are laminated in obverse orientation, the resulting structure is in section as shown in FIG. 2A. Where the structural units are laminated in reverse orientation, the resulting structure is as shown in FIG. 2B.

Accordingly, the conductive material layer pattern 2, i.e. the inner electrode is not exposed to outside nor air, and is enclosed in glass material layer 3. Therefore, the metal material constituting the inner electrode can be hardly oxidized and therefore, can be relatively freely selected from wide range of materials.

Metal with excellent conductivity is preferable for electrode of the capacitor to be used for high frequency circuit. For example, silver, silver-palladium and copper are preferable for material used in the electrode of the capacitor to be used for high frequency circuit. When such metals are used for the electrode patterns enclosed in in the inventive capacitor, the resulting capacitor is excellent in performance and characteristics for high frequency range.

The method of producing the inventive capacitor is as follows. Each of ceramic film pieces is prepared by firing a ceramic green sheet, and therefore, is a thin dielectric plate with low dielectric loss. Conductive material is applied to at least one surface of the fired ceramic film piece to form a conductive material patterns on the ceramic film piece. Conductive paste is applied to either surface of the fired ceramic film piece to form conductive material layer patterns, and further, glass particle paste is applied to the whole surface including the conductive patterns of the ceramic film piece by screen printing technique, to form a glass paste layer on the whole surface of the ceramic film piece. A plurality of such ceramic film pieces with conductive material patterns and glass paste layer are stacked (or laminated) and further, the same ceramic film pieces without any electrode layer and glass layer are positioned on the top and bottom of the stack to provide no exposure of the glass layer and electrode to outside air. At least one of the glass material layer and conductive material layer is used as a joining layer. When the glass material layer is used as a joining layer, the stack of multiple layered ceramic film pieces with conductive material layers and glass material layer is fired at lower temperature to melt the glass material thereby joining the adjacent ceramic pieces sandwiching the corresponding glass layer. When the conductive material layer is used as a joining layer, a conductive paste and/or conductive binder is used to join the adjacent ceramic pieces together in the stack.

The ceramic material used in the inventive capacitor is preferably dielectric material with lower dielectric loss, for example, lower than 0.01 of dielectric loss. The preferable material may include alumina, mullite, steatite, forsterite, beryllia, titania, aluminium nitride, material having perovskite structure, such as barium titanate. All of the conventional compositions can be used to produce the ceramic film pieces of the present invention. For example, additional compounds such as calcium zirconate, strontium titanate, bismuth titanate, calcium stannate, bismuth stannate, bismuth zirconate, lead titanate, barium zirconate and the like can be added to the above barium titanate composition so as to change the electrical properties thereof. Further, many oxide compounds such as manganese oxide, silicon oxide, aluminium oxide, zirconium oxide, titanium oxide, cobalt oxide, nickel oxide and the like can be added to the above mentioned ceramic compositions so as to improve the sintering properties and electrical properties of the ceramic film layers used in the capacitor of the present invention.

In use for high frequency circuitry, when material comprising as a major component, titania and barium titanate is used, the dielectric loss factor at high frequency current is as low as in order of $10^{-4}$, while the dielectric constant is several tens to thousands. On the other hand, when the material essentially consisting of alumina is used for the layers of the capacitor, the dielectric constant is as low as in order of ten, the thickness of the alumina layers must be so small that the required thin layer is impossible to make.

In accordance with the present invention, the lower dielectric loss factor can be attained with use of the material essentially consisting of alumina, which may contain $SiO_2$ and $MgO$ as a minor component. This means that the thickness of the dielectric layer in the capacitor is preferably less than 130 micrometer in accordance with the present invention.

The starting material used for the production of ceramic films to be used for the inventive capacitor can be preferably prepared from metal alkoxide by sol-gel method. So thin film can be produced preferably from the metal alkoxide. The thinner the ceramic layer of the capacitor is, the better the high frequency characteristics of the resulting capacitor is, and the smaller the resulting capacitor is.

The formation of the conductive material layer patterns is illustrated by printing methods, but among them, particularly the thick coating method is preferable. The photo-etching technique for thin coating production can be used for the formation of the conductive layer when the conductive layer is not as a joining layer.

The material used for the formation of conductive layer pattern may include gold, silver, copper, nickel, platinum, palladium and the combination thereof. The paste of such materials is applied to the surface of the ceramic piece to produce conductive patterns, that is, inner electrode patterns on the ceramic pieces. When the capacitor in use for high frequency circuit is produced, silver, gold, copper, palladium or the combination thereof should be used. In the structure of the inventive capacitor, relatively oxidazable metal such as nickel other than the conventional metal to be used for a multi-layered capacitor can be used for the production of the conductive layer.

The production of glass material layer can be carried out as above mentioned by a screen printing technique.

The glass material to form the glass material layer is glass material that can be melt at relatively low temperature, such as boro-silicate glass, and crystallizable glass material. The glass material has preferably a melting point at low temperature, and is easily handled. In heat treatment to join the adjacent ceramic films, the glass material should be melt at the temperature as low as possible so as not to affect the stack of multi-layered capacitor comprising an inner electrode. The temperature at which the stack is heated to melt the glass material and to join the adjacent ceramic layers is preferably 500° C. to 900° C. in order, and more preferably 800° C. to 850° C.

While an alumina is used in the Example, the ceramic materials is preferably a material having lower dielectric constant. The other ceramic materials such as $BaO$-$TiO_2$, and $TiO_2$ are preferable for the ceramic layer of the inventive multi-layered capacitor.

The inventive capacitor can be used for example in a hybrid integrated circuit, and high frequency circuit.

The multi-layered ceramic capacitors of the present invention are illustrated by the following example, but should not be interpreted for the limitation of the invention.

EXAMPLE

A variety of the following combinations as shown in Table 1, which were produced from fired alumina film pieces an glass material paste to prepare dielectric layers and silver paste to prepare inner electrodes, so as to prepare stacked multi-layered capacitor of the present invention. The fired alumina film pieces as used for the production of the multi-layered capacitor were produced by forming alumina green film pieces from an alumina paste prepared from alkoxide metal (aluminium), and firing the formed film pieces to form a very thin fired alumina film pieces. Silver paste was applied to the both surfaces of the alumina film piece 1 (see FIG. 1 of the attached Drawings), by silk screen printing technique, to form pattern layers which were dried and fired to produce conductive layers 2 (inner electrode) on both surfaces of the alumina film piece 1. Then, a lower melting glass paste layer was applied on the whole surfaces of the ceramic film piece including the pattern layers 2 (inner electrode patterns) by a silk screen printing technique, to form glass paste layers 3 over the both surfaces of the alumina film.

At least one of such inner electrode(s) 2 -glass paste layer(s) 3 -alumina film 1 structures as shown in FIG. 1, were laminated to form a stack of alumina film pieces, inner electrodes and glass paste layers. Cover alumina layers 4 of micrometer in thickness each of which has a glass paste layer only on the one surface of the cover alumina film pieces 4 were used on the top and bottom of the stack to produce the laminated structure as shown in FIG. 2 A. The resulting laminated structure was fired under pressure in a refractory furnace at the temperature of 800° C. to 850° C. to melt the glass paste thereby to join firmly the ceramic layers sandwiching thereof. This is, the glass paste in the glass paste layer 3 was melt to join firmly the alumina film pieces 1 including inner electrodes 2 sandwiching the glass material layer in the laminated structure, as shown in FIG. 2 A in sectional view. So fired laminated structure was cut into individual chips of capacitors and the conventional terminal electrodes were applied or formed on the chips thereby to produce multi-layered capacitors.

The electrical properties of the resulting capacitor were measured. The measured equivalent series resistance values are as shown in Table 1.

TABLE 1

| Test No. | Alumina Film Thickness | No. of Alumina Film | No. of Glass layer | Capacity | E.S.R. |
|---|---|---|---|---|---|
| 1 | 50 micron meter | 1 | 2 | 0.5–7pF | 25 miliohm |
| 2 | 50 micron meter | 2 | 3 | 8–12pF | 13 miliohm |
| 3 | 50 micron meter | 3 | 4 | 15–18pF | 8 miliohm |
| 4 | 50 micron meter | 4 | 5 | 22–27pF | 6 miliohm |
| 5 | 80 micron meter | 1 | 2 | 0.5–5pF | 28 miliohm |
| 6 | 80 micron meter | 2 | 3 | 6–10pF | 14 miliohm |
| 7 | 80 micron meter | 3 | 4 | 12–15pF | 9 miliohm |
| 8 | 50 micron meter 80 micron meter | 1 1 | 3 | 7–10pF | 13 miliohm |

For example, in test No. 1, one fired alumina film was sandwithched with two glass material layers, and further, on both surfaces of the top and bottom glass layers the alumina films of 200 micronmeter in thickness were adhered to cover the top and bottom glass material surefaces. The used glass material is boron silicate glass material which is in glass power paste of glass powder of about 16–7 micrometer (available as Nissan Ferro 1129 from Nissan Ferro Company). The capacity values as shown in Table 1 are based on the capacity which has been desired and designed for such stacked multi-layered capacity. The inner electrodes as produced was prepared from silver past which is available as Shouei No. 12995 from Shouei Chemicals. E.S.R. is an equivalent series resistance which means quality of the multi-layered capacitor especially at the high frequency current.

There was found some evidence to provide multi-layered capacitor having very low value of equivalent series resistance at the high frequency current.

From all of the foregoing, it will thus be evident that the present invention enables the manufacture of multi-layered capacitor with less deterioration of dimensional accuracy due to firing shrinkage of the ceramic material, and with relatively high dimentional accuracy and high accuracy in positioning of laminated patterns (inner electrodes) because of lower firing temperature for the production of the multi-layered capacitor.

Use of very thin fired ceramic film (tape) in accordance with the present invention will enable to lower an equivalent series resistance value of the dielectric insulating material in the range of high frequency current, and then to provide high frequency utilizable multi-layered capacitor.

As described in the foregoings, the formation of inner electrode (conductive layer) enclosed or bounded by glass layer and/or ceramic layer will enable use of less expensive metal material such as silver, copper and nickel as a major component making up the electrodes, in stead of costly precious metal such as palladium, and platinum. Further, the structure of the inventive multi-layered capacitor permits the choice of inner electrode material wider, and then, more appropriate electrode materials can be selected, and for example, capacitor with good high frequency characteristics can be more easily manufactured.

Use of glass materials for making a joining layer in the inventive multi-layered capacitor enables the manufacture of multi-layered capacitor with excellent heat-proof, high mechanical strength, high sealing ability and high insulation between the layers.

We claim:

1. a multi-layered ceramic capacitor comprising in combination:
   (a) a plurality of ceramic thin film pieces having been independently fired,;
   (b) joining layers formed on said ceramic thin film pieces in which those are alternatively laminated therein, said ceramic thin film piece having been independently fired, and being sandwiched between two joining layers sandwiching said joining layer, said joining layer consisting essentially of;
      (i) glass material layer and/or (ii) conductive layer, and said conductive material layer being in a pre-determined inner electrode pattern, one or both of the glass material layer and conductive material layer functioning to bind the two ceramic film pieces sandwiching said glass and/or conductive material layer being formed from conductive paste or conductive binder material.

2. The capacitor as claimed in claim 1 wherein said conductive material layers being enclosed in the ceramic thin film pieces and glass material layers, and being not exposed to the outside of the capacitor.

3. The capacitor as claimed in claim 1, wherein said ceramic thin film pieces have dielectric loss of lower than 0.01, and being less than 200 micro-meter in thickness.

4. The multi-layered ceramic capacitor as claimed in claim 1, wherein said conductive material layer consisting essentially of silver, copper, palladium and the combination thereof.

5. a multi-layered ceramic capacitor comprising in combination:
   (a) dielectric layers and conductive material layers alternatively layered therein, said dielectric layer being formed from very thin ceramic plate which has been independently fired, said conductive material layer being formed on one or both surface of said ceramic plate, and said ceramic plates with the conductive layer (s) formed on the surface (s) thereof being mutually bonded by a joining, layer consisting essentially of glass material.

6. The multi-layered ceramic capacitor as claimed in claim 5, wherein the each couple of the conductive material layers sandwiching said glass material joining layer are equal in their potential by conductive coupling therewith together.

7. A method of the production of the multi-layered ceramic capacitor of claim 1 wherein comprises:
   (A) preparing predetermined number of fired ceramic film pieces, the ceramic material being dielectric material such as alumina, barium titanate and the like;
   (B) forming predetermined conductive patterns of thick coatings of conductive material paste on the surfaces of said fired ceramic film pieces by printing said patterns of conductive electroding base metal paste on the said plates by a printing techniques such as silk screen printing;

(C) forming a glass paste material layer over each of the conductive patterns formed on said ceramic film pieces and the whole surfaces of the ceramic film pieces by applying a paste consisting of glass powder and binder medium to the whole surface including the conductive patterns, of said ceramic film pieces.

(D) stacking at least two of such formed ceramic film pieces with said conductive patterns and said glass material layer, (E) further positioning two fired ceramic film pieces each on the most top and on the bottom of the resulting stack.

(F) firing such formed stack at relatively lower temperature so as to melt the glass paste material in said glass paste layer to join together the two adjacent ceramic layers sandwiching the corresponding glass paste layer to provide a multi-layered capacitor with enclosed inner electrodes.

8. A method of preparation of a multi-layered ceramic capacitor of claim 5, which comprises:

(A) firing dielectric material films to prepare number of fired ceramic thin film pieces;

(B) applying conductive electroding paste consisting essentially of metal powder and binding medium on the prepared film pieces to form predetermined patterns as inner electrodes;

(C) further applying glass past consisting essentially of glass powder and binding medium over the surface of each the electroding film pieces to form a glass material layer on the whole surfaces of said prepared film pieces;

(D) stacking at least two of thus formed film pieces;

(E) heating thus formed stack comprising the fired ceramic film pieces, the electroding enclosed in the glass material layer and the ceramic film layer, at relatively lower temperature so as to melt the glass material thereby to form binding between the thus formed film pieces.

9. A multi-layered ceramic capacitor comprising, in combination: fired ceramic film pieces, electroding layers and glass material layers, said fired ceramic material having dielectric loss of lower than 0.01, said electroding layer being formed from conductive paste consisting essentially of metal powder and binding medium, said glass material layer being formed by applying glass powder paste consisting essentially of glass powder and binding medium to the surface of the corresponding ceramic film pieces and melting the glass powder paste to form a glass layer.

10. The multi-layered capacitor of claim 9, wherein the electroding pattern is enclosed among the glass material layer and the ceramic film piece.

11. The multi-layered capacitor of claim 10, wherein the ceramic film pieces have thickness of lower than 130 micrometer.

12. The multi-layered capacitor of claim 9, wherein the metal powder for the electroding pattern is selected from silver, copper, palladium and the combination thereof.

13. The multi-layered capacitor of claim 9, wherein the electroding pattern is formed by printing technique such as screen printing to form thick coating on the surface of the film pieces.

14. The multi-layered capacitor of claim 9, wherein the glass material layer is formed by applying the glass paste over the surfaces of the electroding patterns and the ceramic film pieces.

15. The multi-layered capacitor of claim 9, wherein one or the both of the elecrtroding layer and the glass material layer can act to bind the film pieces each the other.

16. The multi-layered capacitor of claim 9, wherein the dielectric material of the ceramic film pieces is selected from alumina, mullite, steatite, forsterite, berria, titania, aluminium nitride, barium titanate.

17. The multi-layered capacitor of claim 16, wherein the electric material is the composition which is consisting mainly of alumina, and may contain $SiO_2$ and $MgO$.

* * * * *